(12) United States Patent
Gabrys et al.

(10) Patent No.: US 9,708,030 B1
(45) Date of Patent: Jul. 18, 2017

(54) IMPACT-ENERGY TOLERANT METHOD AND STRUCTURES

(75) Inventors: Jonathan W. Gabrys, Downington, PA (US); Richard Laverty, Philadelphia, PA (US); Babu Meka, Devon, PA (US)

(73) Assignee: The Boeing Company, Chicago, IL (US)

( * ) Notice: Subject to any disclaimer, the term of this patent is extended or adjusted under 35 U.S.C. 154(b) by 1615 days.

(21) Appl. No.: 13/315,264

(22) Filed: Dec. 8, 2011

(51) Int. Cl.
*B64C 1/00* (2006.01)
*B63B 1/24* (2006.01)

(52) U.S. Cl.
CPC .................................... *B63B 1/244* (2013.01)

(58) Field of Classification Search
CPC ........ F41H 5/04; F41H 5/0414; F41H 5/0442; F41H 5/0471; B23B 27/08; B23B 27/28; B29C 44/1233; B29C 70/763; B64C 1/064; B64C 3/182; B64C 3/185
USPC ........... 188/371–379; 244/121, 123.1, 123.6, 244/123.13, 134 B; 89/36.02
See application file for complete search history.

(56) References Cited

U.S. PATENT DOCUMENTS

| | | | | |
|---|---|---|---|---|
| 2,776,101 A | * | 1/1957 | McDermott | F16F 1/36 248/633 |
| 4,002,315 A | * | 1/1977 | Van Goubergen | F16F 3/093 248/633 |
| 5,806,796 A | * | 9/1998 | Healey | B29C 44/1233 244/117 R |
| 7,186,092 B2 | * | 3/2007 | Bruce | C23C 30/00 415/217.1 |
| 7,866,605 B2 | * | 1/2011 | Lee | B63B 1/244 244/121 |
| 8,245,972 B2 | * | 8/2012 | Capasso | B32B 3/12 244/123.1 |
| 8,322,657 B2 | * | 12/2012 | West | B64C 3/26 244/123.1 |
| 8,746,619 B2 | * | 6/2014 | Li | B64C 5/06 244/121 |
| 2010/0148006 A1 | | 6/2010 | Olmi et al. | |
| 2010/0252687 A1 | | 10/2010 | Hogan | |

* cited by examiner

*Primary Examiner* — Christopher Schwartz
(74) *Attorney, Agent, or Firm* — McDonnell Boehnen Hulbert & Berghoff LLP (57) ABSTRACT

An impact-energy tolerant method and structures for impact-energy absorption and penetration resistance are disclosed. A body comprising a body end, and a fiber band comprising supplemental attachment sites located between an inner wall and an outer wall of the body end.

14 Claims, 5 Drawing Sheets

IMPACT-ENERGY TOLERANT METHOD AND STRUCTURES

FIELD

Embodiments of the present disclosure relate generally to penetration resistance. More particularly, embodiments of the disclosure relate to penetration resistant structures.

BACKGROUND

Aircraft are susceptible to high velocity impact events with birds, or bird strikes on, for example, blunt leading edges, wings, and stabilizers. To reduce potential anomalies and effects of the impact events, parts or areas of aircraft are generally designed to withstand such an impact event to ensure continued optimal flight and landing.

SUMMARY

An impact-energy tolerant method and structures for impact-energy absorption and penetration resistance are disclosed. A body comprises a body end such as an energy absorbing (deformable) leading edge, and a penetration resistant fiber band is located within a wall of the body end. The penetration resistant fiber band comprises supplemental attachment sites, or "teeth". In this manner, the penetration resistant fiber band redistributes an applied load, generated in response to an impacting object, to a surrounding deformable leading edge. As the leading edge deforms in response to the applied load, the impact-energy is absorbed. Thus, an impact tolerant structure is provided with lighter weight compared to existing solutions.

In an embodiment, an impact-energy tolerant structure comprises a body, and a fiber band. The body comprises a body end. The fiber band comprises supplemental attachment sites and is located between an inner wall and an outer wall of the body end.

In another embodiment, an impact-energy tolerant structure comprises a body, a structural member, and a fiber band. The body comprises a body end, and the structural member comprises a structural-member end and is located in a proximity to the body end. The fiber band comprises supplemental attachment sites, and is coupled to the structural-member end.

In a further embodiment, an impact-energy tolerant method receives an impacting object at a leading edge of a structure, and absorbs an impact energy of the impacting object in a fiber band embedded within the leading edge. The method then redistributes the impact energy of the impacting object to the fiber band embedded within the leading edge and retains the impacting object within the fiber band.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, fluid dynamics, structures, control surfaces, manufacturing, materials, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, a wing leading edge. Embodiments of the disclosure, however, are not limited to such leading edge applications, and the techniques described herein may also be utilized in other fluid dynamic surface applications. For example, embodiments may be applicable to other lift surfaces of an aircraft such as a flap or a tail, a control surface of an aircraft such as an elevator and an aileron, an engine strut, a wind turbine blade, a hydrodynamic surface utilizing liquid (e.g., water) instead of air, a sail boat sail, an engine propeller, a rotor blade, a windmill, or other surface.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
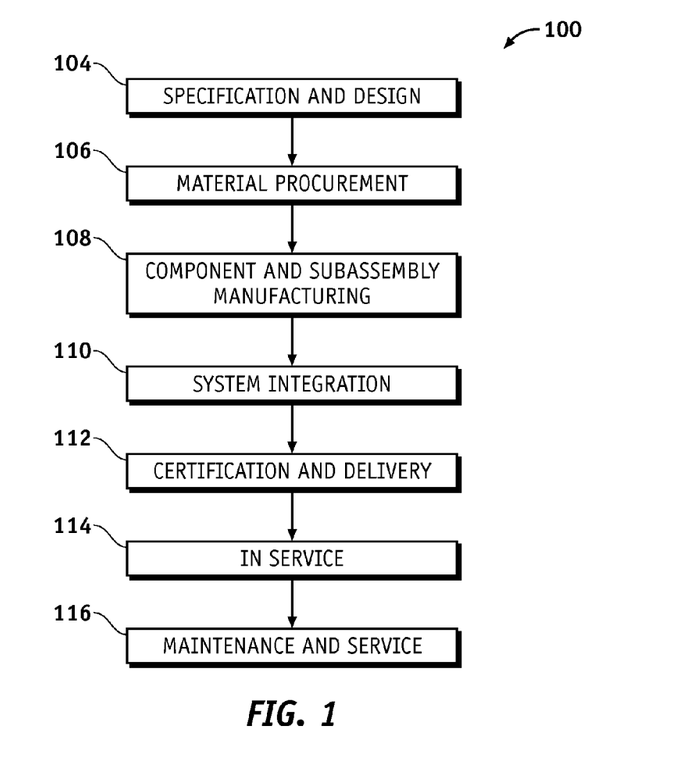
FIG. 1 is an illustration of a flow diagram of an exemplary aircraft production and service methodology.
Figure 2:
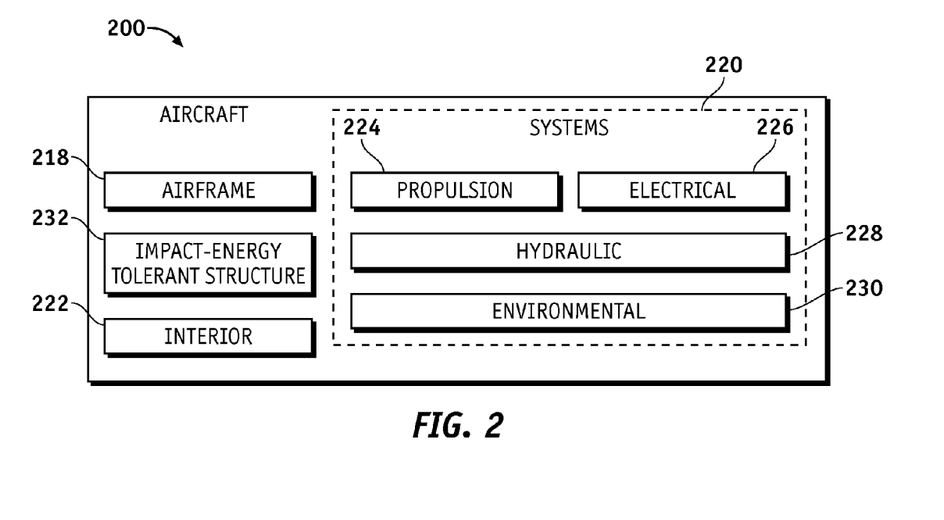
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with an impact-energy tolerant structure 232, a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
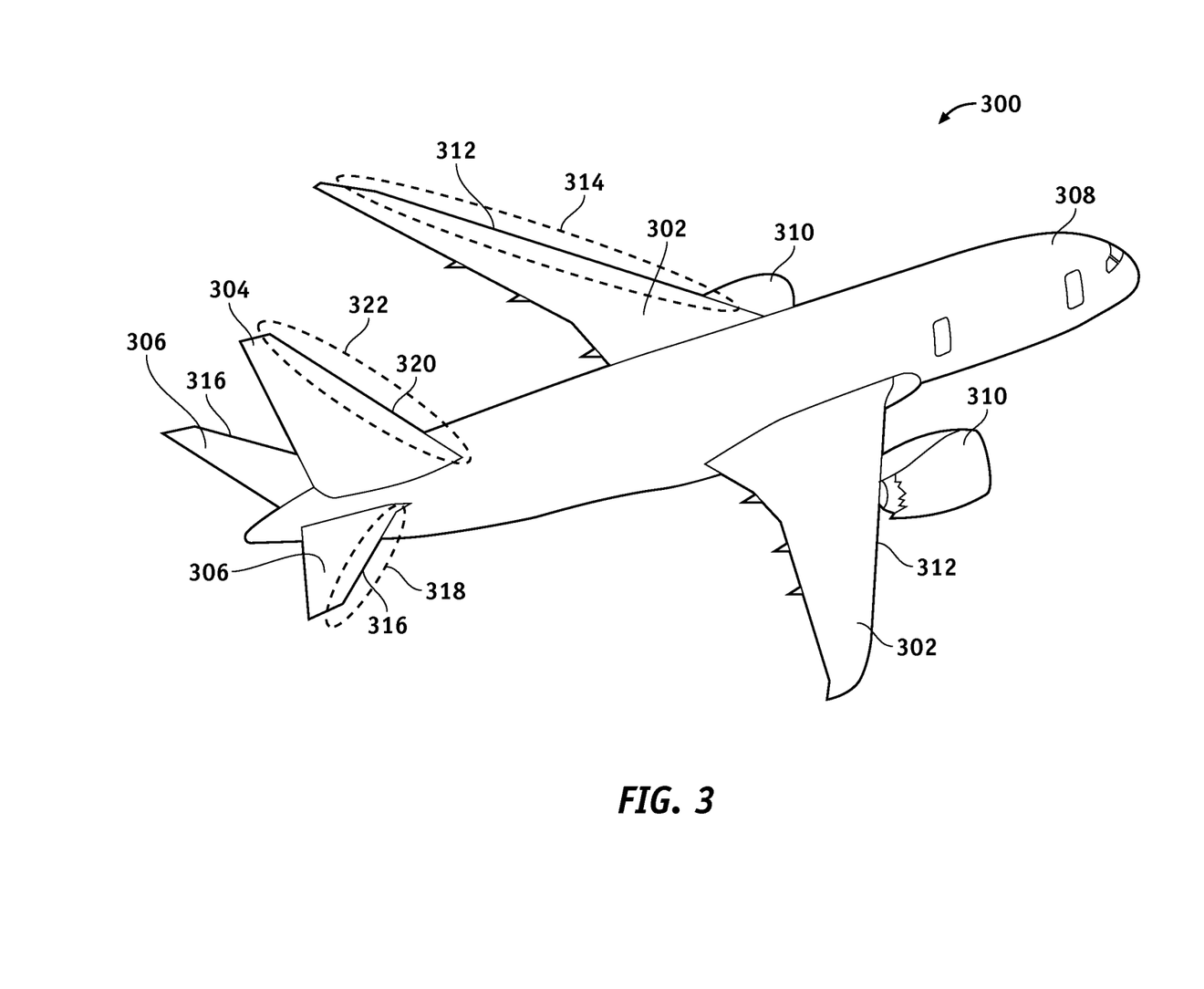
FIG. 3 is an illustration of a perspective view of an exemplary aircraft illustrating various structures comprising leading edges to which embodiments of the present disclosure can be applied.

FIG. 3 is an illustration of a perspective view of an exemplary aircraft 300 illustrating various structures comprising leading edges to which embodiments of the present disclosure can be applied. The aircraft 300 comprises two wings 302, a vertical stabilizer 304 and two horizontal stabilizers 306 each comprising a leading edge. The aircraft 300 also comprises a fuselage 308 to which the wings 302, the vertical stabilizer 304 and the horizontal stabilizer 306 are attached. Two engines 310 are attached to the wings 302 of the aircraft 300.

The aircraft 300 may be susceptible to high velocity impact events with, for example but without limitation, birds, hail, ice, or other debris. To reduce an anomaly and effects of impacts, vulnerable areas of the aircraft 300 comprise a fiber band as a penetration resistant member. The fiber band is designed to withstand such an impact event to ensure continued optimal flight and landing, as explained in detail below.

Potentially vulnerable areas of the aircraft 300 may comprise, for example but without limitation, the wings 302, the vertical stabilizer 304, the horizontal stabilizers 306, or other areas with blunt leading edges that may be relatively more vulnerable to bird, or other impacting object. The wings 302 comprise a leading edge 312 that extends along an area indicated by the ellipse 314. The vertical stabilizer 304 comprises a leading edge 320 that extends along the area indicated by the ellipse 322. The horizontal stabilizers 306 comprise a leading edge 316 that extends along an area indicated by the ellipse 318.

Figure 4:
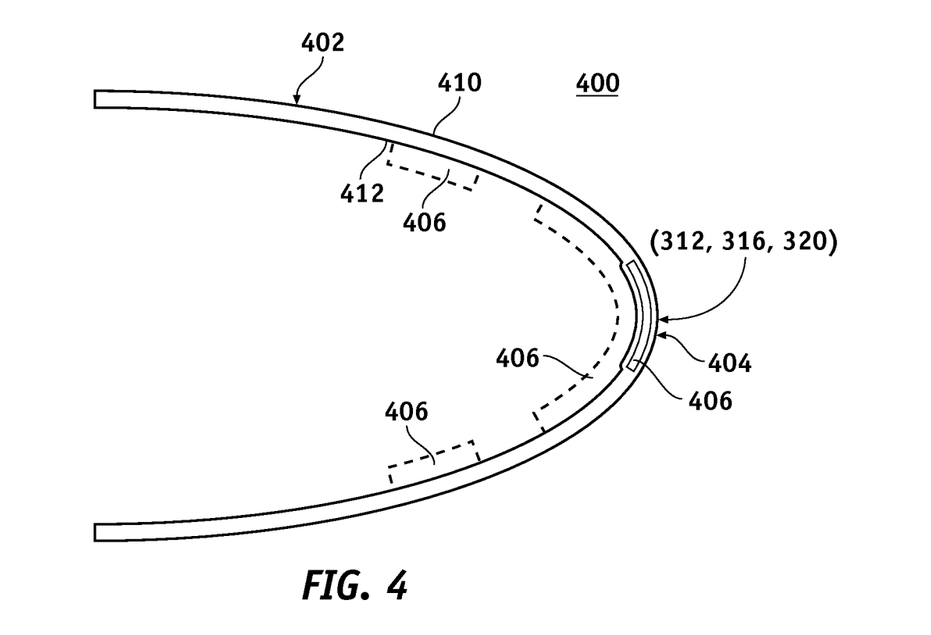
FIG. 4 is an illustration of a schematic exemplary cross sectional view of a leading edge incorporating a penetration resistant member according to embodiments of the disclosure.

FIG. 4 is an illustration of a schematic exemplary cross sectional view 400 of a leading edge 402 such as the leading edge 312, 316, and 320 incorporating a penetration resistant member 406 according to an embodiment of the disclosure. The leading edge 402 may be a deformable leading edge. The cross sectional view 400 may represent a cross section of, for example but without limitation, the wing 302, the vertical stabilizer 304, the horizontal stabilizers 306, or other structure. The penetration resistant member 406 (fiber band 406) improves strike resistance of a structure such as the aircraft 300 or other structure, susceptible to high energy impacts from impacting objects.

The leading edge 402 (body 402) comprises a leading edge end 404 (body end 404), the penetration resistant member 406, an outer face sheet 410 (outer wall 410) and an inner face sheet 412 (inner wall 412). The outer face sheet 410 and the inner face sheet 412 are typically formed of, for example but without limitation, aluminum alloys, fiberglass, or other suitable material. The penetration resistant member 406 may be positioned within a structure in the leading edge end 404 of the leading edge 402.

In one embodiment, the penetration resistant member 406 may be positioned within the leading edge 402 by being integrated or embedded within a sheet member, such as within a laminate or within plies of a composite material, forming a structure.

In one embodiment, the penetration resistant member 406 is located within the leading edge 402 between the outer face sheet 410 (outer wall 410) and the inner face sheet 412 (inner wall 412). The penetration resistant member 406 may be coupled within the leading edge 402 by being adhesively bonded or secured, for example, to a surface of the outer face sheet 410, or to a surface of the inner face sheet 412.

In one embodiment, the penetration resistant member 406, may be attached to the inner face sheet 412 (inner wall 412) such that the inner wall 412 is located between the penetration resistant member 406 and the outer face sheet 410 (outer wall 410).

The penetration resistant member 406 may be coupled to the leading edge 402 by, for example but without limitation, affixing, gluing, bonding, mechanical coupling, or other adhesion and coupling means. The penetration resistant member 406 may be coupled to the leading edge 402 using, for example but without limitation, fasteners, encapsulation, an adhesive, an epoxy, a rivet, or other means.

The penetration resistant member 406 may comprise, for example but without limitation, an ultra-high molecular weight polyethylene, Dyneema™, or other high performance material. Using an ultra-high molecular weight polyethylene such as Dyneema™ in the leading edge 402 provides a better impact resistance and lighter weight as compared to existing structures.

Figure 7:
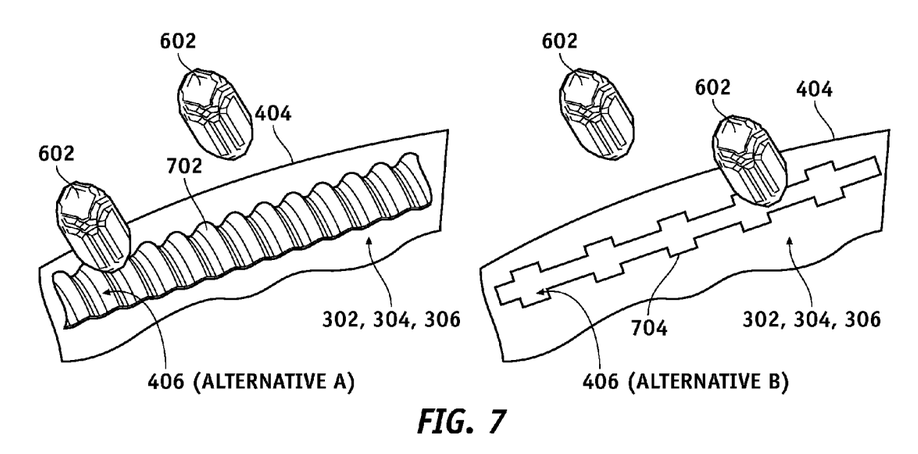
FIG. 7 is an illustration of two penetration resistant members in an environment of a leading edge end (shown within dotted lines of FIG. 6) according to embodiments of the disclosure.

The penetration resistant member 406 can be of any suitable shape or configuration, dependent upon the particular use or application, such as but without limitation, of a generally "C" shape or generally parabolic shape comprising supplemental attachment sites, or "teeth" 702/704 illustrated in FIG. 7, or other suitable configuration. The teeth 702/704 increase pull out resistance out of the leading edge 402 and/or the leading edge end 404 (body end 404). The penetration resistant member 406 can be formed from a strip, piece or pieces of one or more configurations of high strength/high strain material.

The width, thickness and curvature of the strip, piece or pieces forming one or more penetration resistant member 406 can be tailored for a particular application, such as taking into account the curvature of the leading edge 402, pre-existing structural and aerodynamic sizing, the impacting object 602 (FIG. 6) such as bird or other debris, and strike tolerant features to create an optimal, or suitable, design, typically by analysis and/or testing. Additionally, the penetration resistant member 406 can be integrated into new leading edge designs, or used as an improvement on existing leading edges, such as to provide additional resistance capabilities to the impacting object 602.

The penetration resistant member 406 can be positioned selectively, variably, continuously, intermittently or periodically along a length or course of the leading edge 402. For example, the penetration resistant member 406 can be positioned within the body end 404 of the leading edge 402, and/or attached to the inner wall 412 of the leading edge 402 as explained above. Further, the penetration resistant member 406 can be positioned within a structure depending upon a particular use or application, according to various embodiments of the disclosure.

Figure 5:
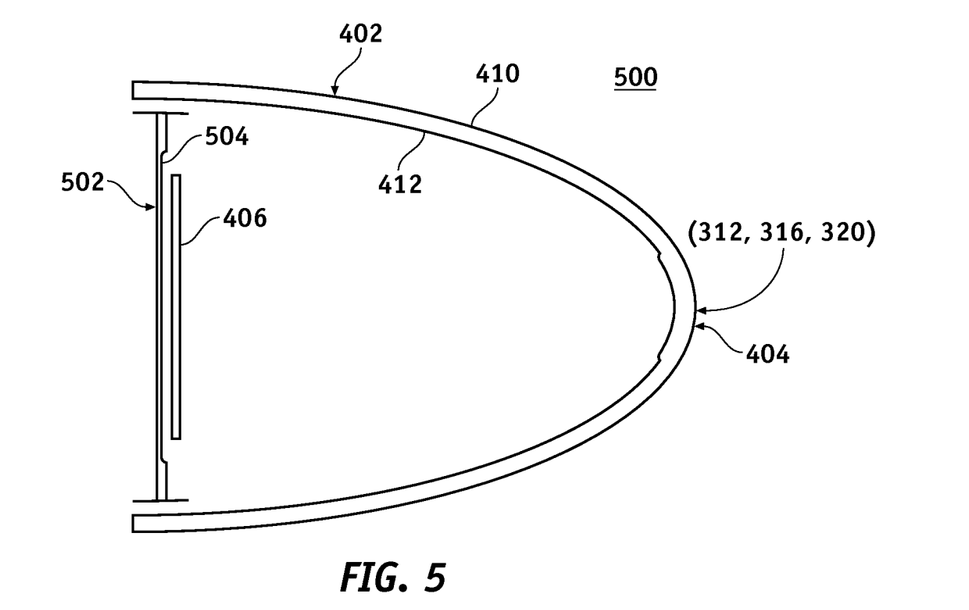
FIG. 5 is an illustration of a schematic exemplary cross sectional view of a leading edge incorporating a penetration resistant member coupled to a structural member according to an embodiment of the disclosure.

FIG. 5 is an illustration of a schematic exemplary cross sectional view 500 of the leading edge 402 incorporating the penetration resistant member 406 coupled to a structural member 502 according to an embodiment of the disclosure. The structural member 502 may be located in a proximity to the body end 404 and the penetration resistant member 406 may be coupled to a structural-member end 504 of the structural member 502. The penetration resistant member 406 may comprise supplemental attachment sites such as the teeth 702 (FIG. 7) that increase a pull out resistance of the structural-member end 504.

When attached to the structural member 502 the energy of an impacting object 602 (FIG. 6) is transferred from the penetration resistant member 406 through to the structural member 502. The structural member 502 may comprise, for example but without limitation, a spar, a rib, or other support structure. The penetration resistant member 406 may be coupled to the structural member 502, by being bonded or affixed, as by being adhesively bonded with an adhesive, such as an epoxy or other suitable adhesive, or as by being affixed, such as by rivets or other suitable fasteners.

While FIG. 4 and FIG. 5 are primarily directed to illustrate embodiments of the disclosure for incorporation in airplane wings and stabilizers, they are also illustrative for other applications of the embodiments of the disclosure, such as for incorporation in blades or propellers, for various other manned or unmanned vehicles that move through or on the air, water, or land, or other propeller driven devices. For example, the impact-energy tolerant structures and methods according to embodiments of the disclosure can be applied to aircraft nose cones, such as to minimize anomaly or breach of the cabin by an impacting object.

Also, the impact-energy tolerant structures and methods of the present disclosure can be applied to watercraft, such as hydrofoils, catamarans, or boat hulls, such as to minimize anomaly from impacting objects, such as logs or other debris, or can be applied to submarines or other submersible craft, such as to minimize anomaly to control surfaces. Further, for example, the impact tolerant structure and methods of the present disclosure can be applied to windmill blades, such as to minimize an anomaly by an impacting object 602 (FIG. 6).

Figure 6:
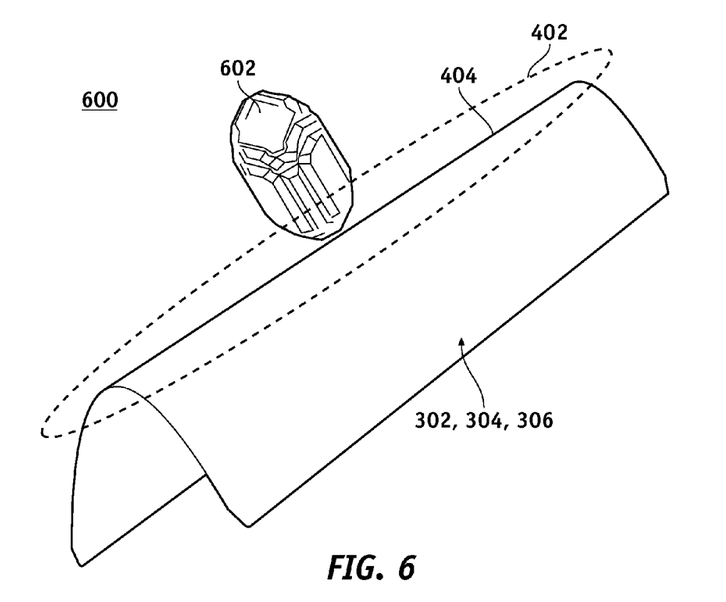
FIG. 6 is an illustration of a leading edge impacted by an impacting object.

FIG. 6 is an illustration of a structure 600 comprising the penetration resistant member 406 (fiber band 406) that is impacted by the impacting object 602. The structure 600 may comprise, the wing 302, the vertical stabilizer 304, the horizontal stabilizers 306, each comprising the leading edge 402 (body 402) comprising the leading edge end 404 (body end 404). The impacting object 602 may comprise, for example but without limitation, birds, hail, ice, or other debris.

In practice, the leading edge 402 may receive an impact-energy from the impacting object 602. The impact energy is absorbed in the fiber band 406 (FIGS. 1 and 7) embedded within the leading edge 402, and redistributed in the fiber band 406. The fiber band 406 assists in retaining the impacting object 602 therewithin upon an impact thereof. The teeth 702/704 (FIG. 7) of the fiber band 406 provide resisting pull out of the leading edge 402 and/or the leading edge end 404. In an embodiment, the impact-energy may also be redistributed to the structural member 502 (FIG. 5) coupled to the fiber band 406.

FIG. 7 is an illustration of two penetration resistant members 406 (fiber band 406: alternative a and alternative b) in an environment of the leading edge end 404 of the leading edge 402 of FIG. 6 showing the supplemental attachment sites, or "teeth" 702 and 704, respectively, according to embodiments of the disclosure. In one embodiment, the fiber band 406 (alternative a) comprises the teeth 702 having a round shape, and in another embodiment the fiber band 406 (alternative b) comprises the teeth 704 having a square shape. The teeth 702/704 may comprise other suitable configurations that can provide resisting pull out of the leading edge 402 and/or the leading edge end 404.

The fiber band 406 (e.g., alternative a or alternative b) is operable to absorb and redistribute the impact energy therewithin, and is further operable to retain the impacting object 602 therewithin. In this manner, the penetration resistant member 406 redistributes an applied load generated in response to the impact-energy of the impacting object 602 to a surrounding deformable leading edge such as the leading edge 402. As the leading edge 402 deforms in response to the applied load, the impact-energy is absorbed.

Figure 8:
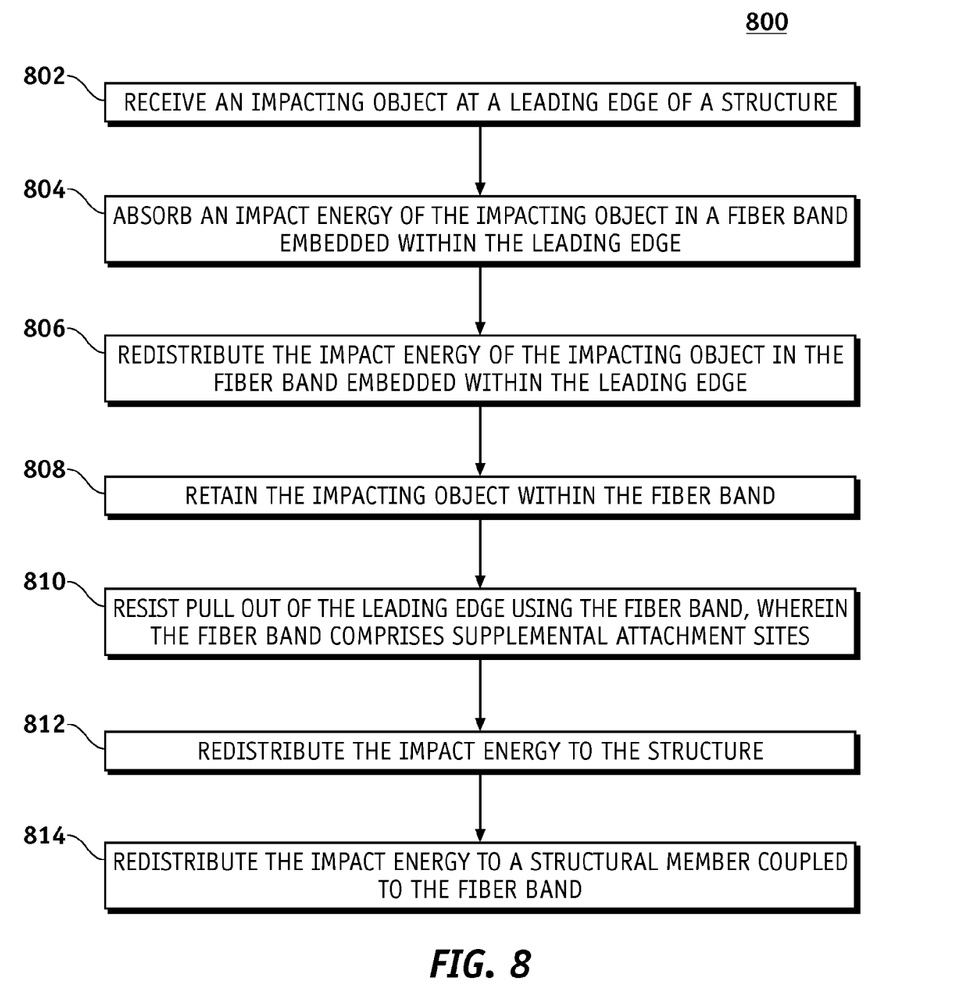
FIG. 8 is an illustration of an exemplary flowchart showing an impact-energy tolerant process for absorbing and redistributing impact energy on a structure according to an embodiment of the disclosure.

FIG. 8 is an illustration of an exemplary flowchart showing an impact-energy tolerant process 800 (process 800) for absorbing/redistributing impact energy on a structure according to an embodiment of the disclosure. The various tasks performed in connection with the process 800 may be performed mechanically, by software, hardware, firmware, or any combination thereof. For illustrative purposes, the following description of the process 800 may refer to elements mentioned above in connection with FIGS. 3-5. In practical embodiments, portions of the process 800 may be performed by the leading edge 402, the leading edge end 404, the penetration resistant member 406, supplemental attachment sites, or "teeth" 702/704, the structural member 502, the structural-member end 504, etc. Process 800 may have functions, material, and structures that are similar to the embodiments shown in FIGS. 3-5. Therefore, common features, functions, and elements may not be redundantly described here.

Process 800 may begin by receiving an impacting object such as the impacting object 602 at a leading edge such as the leading edge 402 of a structure such as the wing 302 (task 802).

Process 800 may continue by absorbing an impact energy of the impacting object 602 in a fiber band such as the fiber band 406 embedded within the leading edge 402 (task 804).

Process 800 may continue by redistributing an impact energy of the impacting object 602 in the fiber band 406 embedded within the leading edge 402 (task 806).

Process 800 may continue by retaining the impacting object 602 within the fiber band 406 (task 808).

Process 800 may continue by resisting pull out of the leading edge 402 using the fiber band 406, wherein the fiber band 406 comprises supplemental attachment sites such as the teeth 702/704 (task 810).

Process 800 may continue by redistributing the impact energy to the structure (task 812).

Process 800 may continue by redistributing the impact energy to a structural member such as the structural member 502 coupled to the fiber band 406 (task 814).

In this way, various embodiments of the disclosure provide an impact-energy tolerant structure that comprises better resistance and lighter weight as compared to existing solutions.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-8 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An impact-energy tolerant structure, comprising:
   a body comprising a body end; and
   a fiber band comprising supplemental attachment sites located between an inner wall and an outer wall of the body end, wherein the supplemental attachment sites comprise teeth that increase a pull out resistance of the body end, and wherein the fiber band is operable to retain an impacting object within the inner wall and the outer wall of the body end.

2. The impact-energy tolerant structure of claim 1, wherein the fiber band is operable to absorb energy from an impact by the impacting object.

3. The impact-energy tolerant structure of claim 1, further comprising a structural member located in a proximity to the body end, wherein the fiber band is coupled to the structural member.

4. The impact-energy tolerant structure of claim 1, wherein the body comprises a leading edge and the body end comprises a leading edge end of the leading edge.

5. The impact-energy tolerant structure of claim 1, wherein the fiber band comprises an ultra-high molecular weight polyethylene.

6. The impact-energy tolerant structure of claim 1, wherein the impact-energy tolerant structure comprises at least one of: a wing, a horizontal stabilizer, a vertical stabilizer, a propeller, and a rotor blade.

7. An impact-energy tolerant structure comprising:
   a body comprising a body end;
   a structural member comprising a structural-member end located in a proximity to the body end; and
   a fiber band comprising supplemental attachment sites and coupled to the structural-member end, wherein the supplemental attachment sites comprise teeth that increase a pull out resistance of the structural-member end, and wherein the fiber band is operable to retain an impacting object within an inner wall and an outer wall of the body end.

8. The structure of claim 7, wherein the fiber band comprises an ultra-high molecular weight polyethylene.

9. The structure of claim 7, wherein the fiber band is attached to the inner wall of the body end such that the inner wall is located between the fiber band and the outer wall of the body end.

10. An impact-energy tolerant method, comprising:
receiving an impacting object at a leading edge of a structure;
absorbing an impact energy of the impacting object in a fiber band embedded within the leading edge;
redistributing the impact energy of the impacting object in the fiber band embedded within the leading edge;
retaining the impacting object within the fiber band; and
resisting pull out of the leading edge using the fiber band, wherein the fiber band comprises supplemental attachment sites, wherein the supplemental attachment sites comprise teeth that increase a pull out resistance of the leading edge.

11. The impact-energy tolerant method of claim 10, further comprising redistributing the impact energy to the structure.

12. The impact-energy tolerant method of claim 10, further comprising redistributing the impact energy to a structural member coupled to the fiber band.

13. The impact-energy tolerant method of claim 10, wherein the fiber band comprises an ultra-high molecular weight polyethylene.

14. The impact-energy tolerant method of claim 10, wherein the structure comprises at least one of: a wing, a horizontal stabilizer, a vertical stabilizer, a propeller, and a rotor blade.

* * * * *